US012418963B2

(12) United States Patent
Taniguchi et al.

(10) Patent No.: US 12,418,963 B2
(45) Date of Patent: Sep. 16, 2025

(54) HEATING COOKER

(71) Applicant: Panasonic Intellectual Property Management Co., Ltd., Osaka (JP)

(72) Inventors: Naoya Taniguchi, Kyoto (JP); Hirohisa Imai, Shiga (JP); Gantetsu Matsui, Kyoto (JP); Shinya Iwadare, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 811 days.

(21) Appl. No.: 17/429,329

(22) PCT Filed: Dec. 11, 2019

(86) PCT No.: PCT/JP2019/048580
§ 371 (c)(1),
(2) Date: Aug. 7, 2021

(87) PCT Pub. No.: WO2020/170568
PCT Pub. Date: Aug. 27, 2020

(65) Prior Publication Data
US 2022/0151037 A1 May 12, 2022

(30) Foreign Application Priority Data
Feb. 22, 2019 (JP) .................. 2019-029953

(51) Int. Cl.
H05B 6/64 (2006.01)
G06V 10/143 (2022.01)
H04N 23/73 (2023.01)

(52) U.S. Cl.
CPC .......... *H05B 6/6447* (2013.01); *G06V 10/143* (2022.01); *H04N 23/73* (2023.01); *G06V 2201/07* (2022.01)

(58) Field of Classification Search
CPC ...... H04N 23/73; H04N 23/74; G06V 10/143; G06V 10/20; F24C 7/085
See application file for complete search history.

(56) References Cited

U.S. PATENT DOCUMENTS

2018/0279425 A1* 9/2018 Matsui ................. H05B 6/6444

FOREIGN PATENT DOCUMENTS

CN 102413712 A * 4/2012 ............... A21B 1/42
CN 106603933 4/2017
(Continued)

OTHER PUBLICATIONS

International Search Report of PCT application No. PCT/JP2019/048580 dated Feb. 4, 2020.
(Continued)

Primary Examiner — Thien S Tran
(74) Attorney, Agent, or Firm — Rimon P.C.

(57) ABSTRACT

A heating cooker includes a heating cavity for accommodating a heating target, an imager for capturing an image of an interior of the heating cavity, and an exposure controller for performing exposure control. The exposure controller is operable to perform the exposure control based on gray level information obtained from the image captured by the imager. As a result, it is possible to acquire an image for recognition after accurately detecting the illuminance of the interior of the heating cavity and performing exposure control.

8 Claims, 11 Drawing Sheets

(56) References Cited

FOREIGN PATENT DOCUMENTS

| | | | |
|---|---|---|---|
| CN | 107597776 A | * | 1/2018 |
| CN | 108139078 A | | 6/2018 |
| JP | 2001-349546 | | 12/2001 |
| WO | WO-2017090244 A1 | * | 6/2017 .............. F24C 7/085 |
| WO | 2018/235702 | | 12/2018 |

OTHER PUBLICATIONS

The Extended European Search Report dated Mar. 21, 2022 for the related European Patent Application No. 19915971.6.
English Translation of Chinese Search Report dated Jan. 10, 2024 for the related Chinese Patent Application No. 201980092379.4.

* cited by examiner

HEATING COOKER

TECHNICAL FIELD

The present disclosure relates to a heating cooker for heating food, and to a method of controlling the heating cooker.

BACKGROUND ART

Microwave ovens, which are an example of heating cookers, are able to heat a food item that is placed in a container without using pots or pans. This may allow retail stores, such as convenience stores, to heat food items such as box lunches and prepared foods with use of a microwave oven when selling the food items.

Usually, the packages of box lunches and prepared foods carry an indication of an optimum heating time for heating with a microwave oven. It is common practice for a store worker to look at the indication to set a heating time for a microwave oven accordingly.

More specifically, the store worker may set a heating time by operating numeric keys arranged in an operation panel of the microwave oven.

Alternatively, when using a microwave oven provided with a plurality of cooking buttons corresponding to different heating times or cooking powers, the store worker may cause the microwave oven to perform suitable heating for the food to be heated by operating a button corresponding to the food to be heated.

However, it is a troublesome operation to set a heating time with use of numeric keys. Moreover, in the case of a microwave oven in which a plurality of operation buttons are assigned respectively to a plurality of heating times for different food items, the store workers need to memorize the corresponding relationship between the food items and the corresponding buttons. Consequently, a problem arises that, as the number of items increases, the burden on the store workers of memorizing the correspondence relationship increases correspondingly.

In order to solve such problems, it has been proposed to provide a microwave oven that allows a store worker to scan a barcode attached to an item and heats the item according to the heating control content corresponding to the barcode.

Another microwave oven is proposed that includes a camera disposed in a ceiling surface of the heaving cavity interior, for capturing an image of the heating cavity interior of the microwave oven. This conventional microwave oven extracts a barcode portion from an image of the item placed in a cavity interior, and reads the barcode. As a result, the content of heating control corresponding to the item is called from the code information, and appropriate heating is carried out (see, for example, PTL 1).

There has already been an example of disclosure of a microwave oven that acquires a food image with a camera installed so as to capture an image of the heating cavity interior, performs an image recognition process, and carries out cooking according to the result of the recognition.

CITATION LIST

Patent Literature

PTL 1: Japanese Patent Unexamined Publication No. 2001-349546

SUMMARY

In a conventional microwave oven, the interior of the heating cavity is illuminated with a illumination such as an LED at an appropriate illuminance, and an image suitable for the image recognition process is acquired by a camera.

At that time, depending on the environment in which the microwave oven is installed, ambient light such as sunlight may enter the interior of the heating cavity through the aperture of the door, causing the illuminance of the interior of the heating cavity to deviate from a suitable illuminance for image processing. In an image captured in a state in which ambient light enters, the portion on which the recognition process is to be performed may be overexposed, so that the recognition rate may be lowered significantly.

It is an object of the present disclosure to provide a heating cooker that acquires an image for image recognition after accurately detecting the illuminance of the heating cavity interior from an image captured by a camera and performing exposure control, even when ambient light such as sunlight enters through the aperture of the door. This makes it possible to increase the recognition accuracy for the image to be recognized.

In order to solve these and other problems in the prior art, a heating cooker according to the present disclosure includes a heating cavity for accommodating a heating target, an imager for capturing an image of an interior of the heating cavity, and an exposure controller for performing exposure control. The exposure controller is operable to perform the exposure control based on gray level information obtained from the image captured by the imager.

A heating cooker according to the present disclosure is able to acquire an image for image recognition, after accurately detecting the illuminance of the heating cavity interior from an image captured by a camera and performing exposure control, even when ambient light such as sunlight enters through the aperture of the door. This makes it possible to increase the recognition accuracy for the image to be recognized.

DESCRIPTION OF EMBODIMENTS

Figure 1:
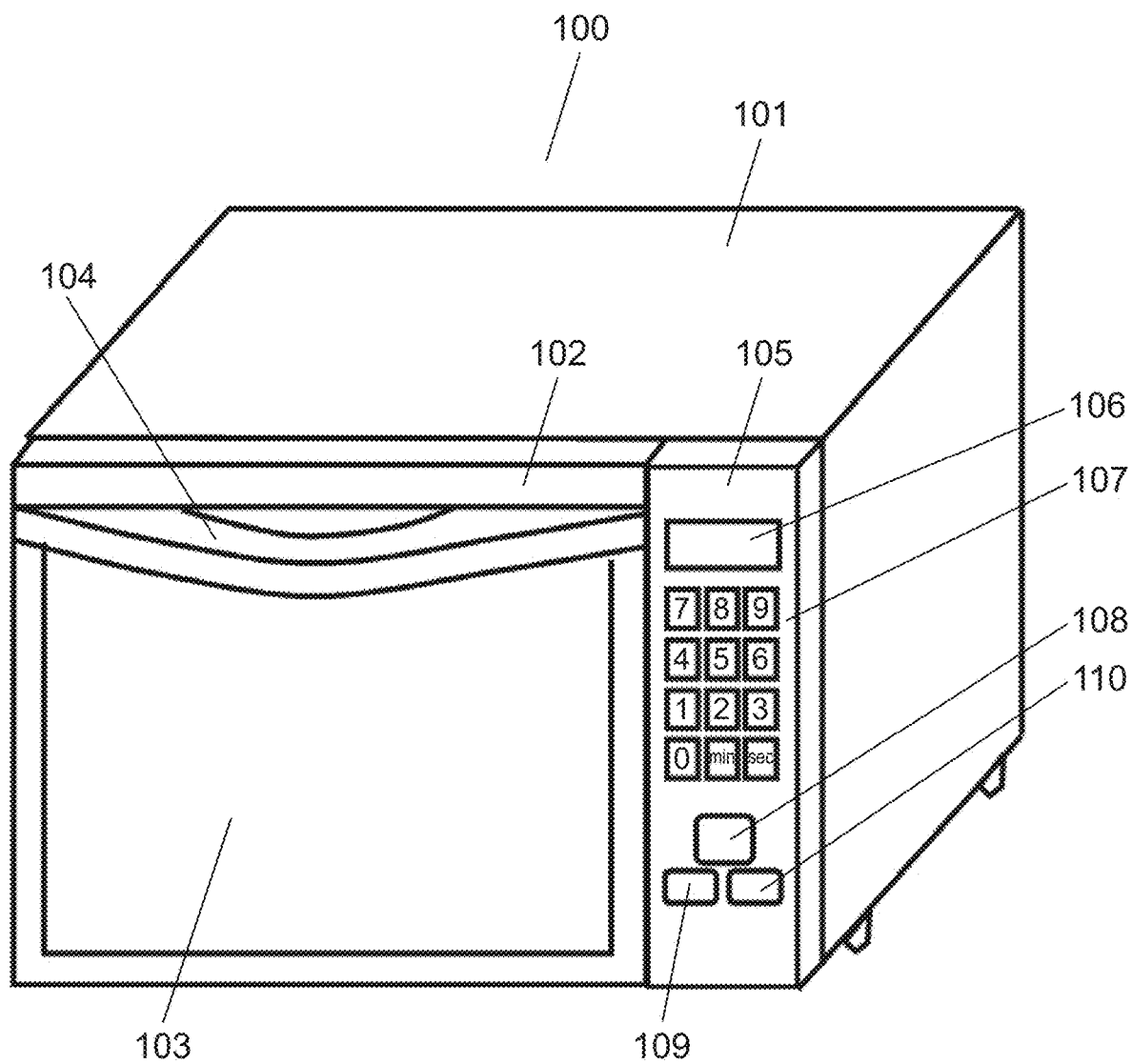
FIG. 1 is a perspective view illustrating an external appearance of a heating cooker according to a first exemplary embodiment of the present disclosure.

A heating cooker according to a first aspect includes a heating cavity for accommodating a heating target, an imager for capturing an image of an interior of the heating cavity, and an exposure controller for performing exposure control, and the exposure controller is operable to perform the exposure control based on gray level information obtained from the image captured by the imager.

As a result, it is possible to accurately detect the illuminance of the heating cavity interior from an image captured by a camera, perform exposure control accordingly, and thereafter acquire an image for recognition, even when ambient light such as sunlight enters through the aperture of the door. This makes it possible to increase the recognition accuracy for the image to be recognized.

A heating cooker according to a second aspect further includes, in the first aspect, a photometering target detector for extracting a photometering target from the image captured by the imager, and the photometering target detector is operable to pass the gray level information of a portion of the image, which is the photometering target, and the exposure controller is operable to perform the exposure control based on the gray level information of the photometering target portion.

As a result, the exposure control may be performed based on the gray level information of an image that has undergone a filtering process of passing only the feature of the photometering target in advance. This makes it possible to increase the accuracy of the exposure control.

In a heating cooker according to a third aspect, in the second aspect, the photometering target detector is operable to pass only a predetermined proportion of higher gray level values in the image.

This makes it possible to perform the filtering process with high accuracy and at high speed for a photometering target that is known in advance to have a high brightness and a relatively high gray level value when the image is captured, such as in the case of a white label.

In a heating cooker according to a fourth aspect, in the second aspect, the photometering target detector is operable to pass only pixels having gray level values with a predetermined gray level difference from a pixel in a predetermined pixel region of the photometering target.

This makes it possible to perform the filtering process with high accuracy in cases where the photometering target is known in advance to be a portion in which the white and black contrast is high, such as in the case of a label in which black characters or black barcodes are printed in a white background.

In a heating cooker according to a fifth aspect, in the second aspect, the photometering target detector is operable to pass only gray level values of pixels that are within a predetermined chromaticity range.

This makes it possible to perform the filtering process with high accuracy and at high speed when the colors of the label that is to be the photometering target are limited in advance.

In a heating cooker according to a sixth aspect, in any of the second to fifth aspects, the photometering target detector is operable to notify a user that a recognition target is not detected when the number of pixels that have been detected as the photometering target is less than a predetermined number.

This allows the user to be notified that the recognition target is not detected at an early stage where the recognition process has not yet been performed, when, for example, the recognition target is not placed within the range of image capturing, or is partially located outside the field of view. As a result, the user may be urged to place the food again or check the condition of the label that is the recognition target.

Hereinbelow, exemplary embodiments will be described in detail with reference to the drawings. However, unnecessarily detailed description may be omitted. For example, detailed description of well-known matters and repetitive description of substantially the same structures may be omitted. This is to prevent the following description from becoming redundant and to facilitate understanding for those skilled in the art.

It should be noted that the appended drawings and the following description are provided for those skilled in the art to sufficiently understand the present disclosure, and they are not intended to limit the subject matter set forth in the claims.

First Exemplary Embodiment

Hereinbelow, a heating cooker according to a first exemplary embodiment of the present disclosure will be described with reference to the drawings.

FIG. 1 is a view illustrating an external appearance of a heating cooker according to the first exemplary embodiment of the present disclosure.

Microwave oven 100 shown in FIG. 1 includes housing 101 and door 102 that is pivotably supported on housing 101 so as to be able to open and close. Heating cavity 201 for accommodating food items, such as packages of box lunches or prepared foods, (i.e., heating target 203) is disposed inside housing 101.

Door 102 has a transparent glass window 103 so that the user can see the interior of housing 101. In addition, door 102 also has handle 104 so that the user can easily hold door 102.

In the present exemplary embodiment, the following description assumes that a side of housing 101 on which door 102 is provided is the front, a right side viewed toward the rear from the front is the right, and a left side viewed toward the rear from the front is the left.

Operation display unit 105 is disposed adjacent to door 102. Operation display unit 105 includes liquid crystal display 106, time setting button group 108, cancel button 109, and pause button 110. The user is able to set a heating time by using numeric buttons, "minute" button, and "second" button. Liquid crystal display 106 displays information such as the heating time that has been set.

Heating start button 108 is a button used to start heating after the user has confirmed heating time, wattage, and so forth, with liquid crystal display 106. Cancel button 109 is a button used to stop heating after the user has pressed heating start button 108 to start heating, or to cancel the setting of the heating time displayed on liquid crystal display 106.

Pause button 110 is a button used to temporarily stop heating while heating is in progress. After the heating has been paused, the user is able to restart heating by pressing heating start button 108 again.

Figure 2:
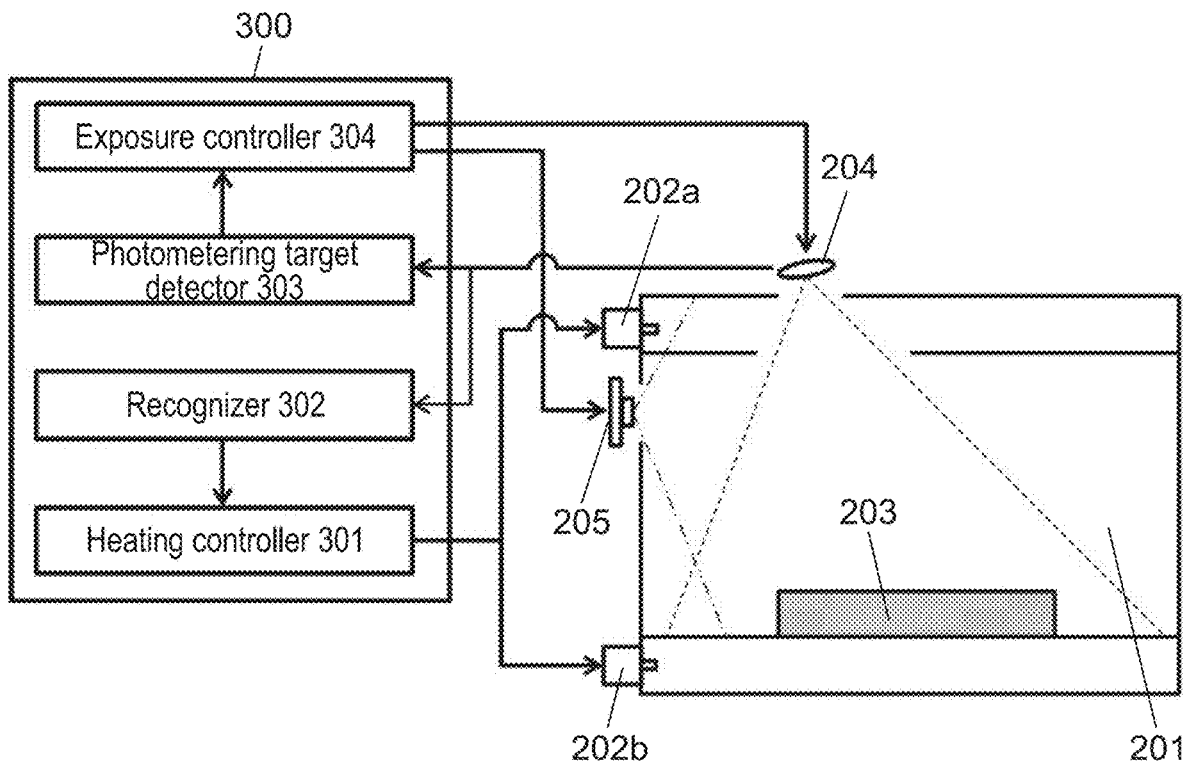
FIG. 2 is a schematic configuration view of the heating cooker according to the first exemplary embodiment of the present disclosure.

FIG. 2 is a schematic configuration view of microwave oven 100 according to the first exemplary embodiment.

Microwave oven 100 includes, as a heating unit, two magnetrons 202a and 202b that output microwaves into heating cavity 201.

Magnetron 202a is disposed at a ceiling side of heating cavity 201. Magnetron 202a outputs microwaves into heating cavity 201 from above. On the other hand, magnetron 202b is disposed at a bottom side of heating cavity 201. Magnetron 202b outputs microwaves into heating cavity 201 from below. A food item placed in heating cavity 201, such as box lunches or prepared foods, that is, heating target 203, is heated by radiated microwaves.

Although the present disclosure illustrates the microwaves generated by magnetrons for the heating unit as an example, it is possible to perform heating by other means, example of which include microwaves generated by semiconductor oscillation, heater, hot air, and steam. It is also possible that only one heating source such as magnetron may be provided, instead of two magnetrons.

Camera 204 (an example of imager) is disposed at a ceiling side of heating cavity 201. Camera 204 includes an imaging element, such as a charge coupled device (CCD), and an optical element, such as a lens. Camera 204 captures and produces an image of the interior of heating cavity 201. In the produced image, the luminance of each pixel is represented by a value in range from 0 (dark) to 255 (bright), for example. It is also possible to generate an image in which each color of red, blue, and green of each of the pixels is represented by a value from 0 to 255. It is also possible that a value corresponding to each of the pixels may be represented using other representation techniques or a numerical range other than the range from 0 to 255.

In the present exemplary embodiment, camera 204 is disposed on the ceiling side surface of heating cavity 201. However, camera 204 may be disposed on another surface, such as a left side surface or a right side surface, of heating cavity 201. It should be noted that the present disclosure achieves higher recognition accuracy for an image even when imager 204 is composed of one camera member, by meticulously designing the exposure conditions as will be described later. As a result, the manufacturing cost can be reduced, and the size of housing 101 can also be reduced. However, this is merely exemplary, and imager 204 may be composed of a plurality of camera members.

Illumination 205 including an LED as a light source is disposed on a side surface of heating cavity 201. Illumination 205 illuminates the interior of heating cavity 201.

In the present exemplary embodiment, illumination 205 is disposed so as to be directed toward the interior of heating cavity 201 from the left side surface of heating cavity 201. However, illumination 205 may be disposed on any of the four side surfaces, the ceiling, or the bottom surface. It is also possible to provide a plurality of illuminations 205.

Although the present exemplary embodiment discloses that the light source of illumination 205 is an LED, it is also possible to use other types of light source, such as an incandescent lamp, a fluorescent lamp, or natural light.

Controller 300 is disposed below operation display unit 105. Controller 300 controls various elements of microwave oven 100.

Referring to FIG. 2, controller 300 includes heating controller 301, recognizer 302, photometering target detector 303, and exposure controller 304.

In the present exemplary embodiment, controller 300 is composed of an integrated component that includes heating controller 301, recognizer 302, photometering target detector 303, and exposure controller 304. It is also possible, however, that these components may be composed of separate semiconductor elements or the like. Alternatively, controller 300 may be composed of a microcomputer including a processor, such as a central processing unit (CPU).

Heating controller 301 controls magnetron 202a and magnetron 202b. The microwaves emitted by magnetron 202a and magnetron 202b serve to heat heating target 203 accommodated in heating cavity 201.

Recognizer 302 recognizes articles, such as food items, and also recognizes characters and graphical codes, such as barcodes, that are attached to the food items and the like, from an image captured by camera 204.

Photometering target detector 303 performs on the image captured by camera 204 a filtering process of passing the gray level value of the pixels in a food label portion that is the target of recognition and photometering, and thereafter calculates the average gray level value of the entire image. A photometering target is extracted by referring to the calculated average gray level value as an estimated gray level value of the photometering target portion. That is, from the image captured by camera 204, photometering target detector 303 passes the gray level information of a photometering and recognition target portion.

Exposure controller 304 determines whether or not exposure adjustment is necessary based on the estimated gray level value that is output by photometering target detector 303. Then, exposure controller 304 controls camera 204 or illumination 205 so as to change exposure settings as necessary.

Figure 3:
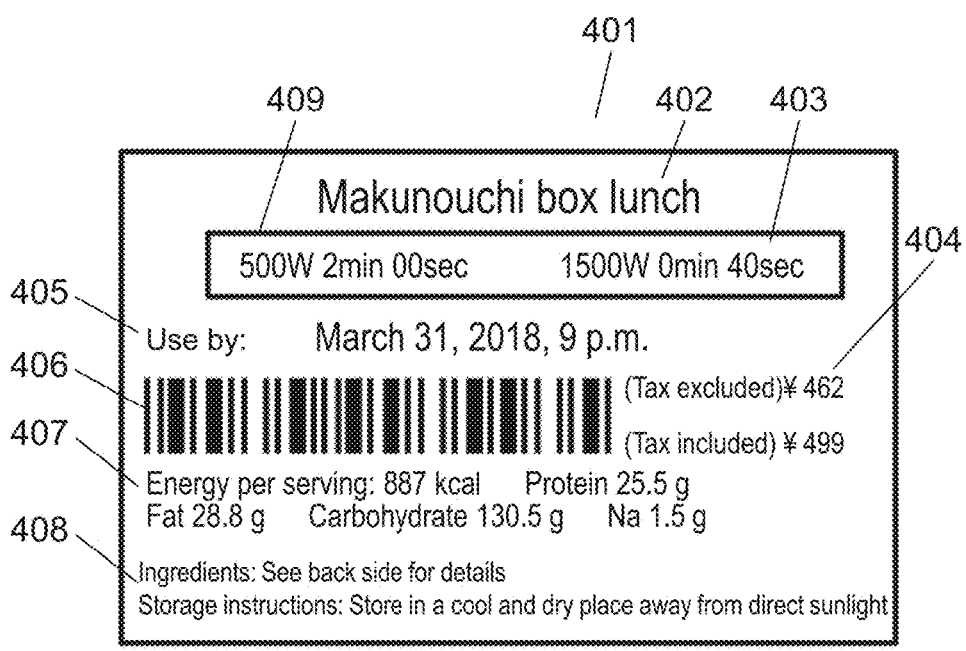
FIG. 3 is a view illustrating an item information label containing heating control information that is displayed on an item that is to be heated with the heating cooker according to the first exemplary embodiment of the present disclosure.

FIG. 3 shows an example of a label affixed to a food item.

Items such as box lunches, rice balls, and prepared dishes may be placed in heating cavity 201 and heated. A label, which has been mentioned earlier, is affixed to each of these items. The label indicates information necessary to cook the items, such as heating power and heating time.

Note that the information necessary for cooking, such as heating power and heating time, is referred to as "heating control information" in the present exemplary embodiment.

Label 401 displays various information such as heating control information 403, price information 404, use-by date information 405, barcode 406 (which may be other types of graphical code) for identifying the item, nutrition information 407, and notice information 408. In the present exemplary embodiment, the heating control information is enclosed in rectangular frame 409 so that the heating control information can be easily extracted from these various pieces of information.

In addition, this label 401 indicates both a heating time for heating at 500 W, for example, as a guideline for heating with a general home-use microwave oven, and a heating time for heating at 1500 W, for example, as a guideline for heating with a commercial-use high power microwave oven for a short time. For example, label 401 displays "500 W 2 mins. 00 secs. 1500 W 0 mins. 40 secs." as the heating control information.

The user opens door 102 and places a food item in heating cavity 201, and then, camera 204 captures an image of the interior of heating cavity 201. Then, from the image captured by camera 204, recognizer 302 recognizes a location where the heating control information is displayed, and recognizes the characters and numerals in the heating control information.

More specifically, recognizer 302 recognizes rectangular frame 409 from the image captured by camera 204.

Next, recognizer 302 recognizes a character string of alphanumeric characters "500W200 1500W040" enclosed in this rectangular frame 409.

Then, according to a predetermined analytical rule, recognizer 302 divides the character string into a numerical string before the character "W", a three-digit numerical string that follows the character "W", a following numerical string before the character "W", and another three-digit numerical string that follows the character "W", i.e., "500", "200", "1500", and "040", respectively. Recognizer 302 further recognizes that, in the second numerical string and the fourth numerical string, the first digit indicates "minutes" and the following two digits indicate "seconds", and that the power indicated by the first numerical string corresponds to the time indicated by the second numerical string while the power indicated by the third numerical string corresponds to the time indicated by the fourth numerical string. Thus, recognizer 302 recognizes the heating control information indicating 2 minutes for heating with 500 W and 40 seconds for heating with 1500 W.

In the present exemplary embodiment, such a food label portion (label 401) is the target of recognition and photometering, not the entire cavity interior image. In addition, although the details will be discussed later, a gray level value of the food label portion (label 401) serves as the target of gray level estimation for exposure adjustment.

Figure 4:
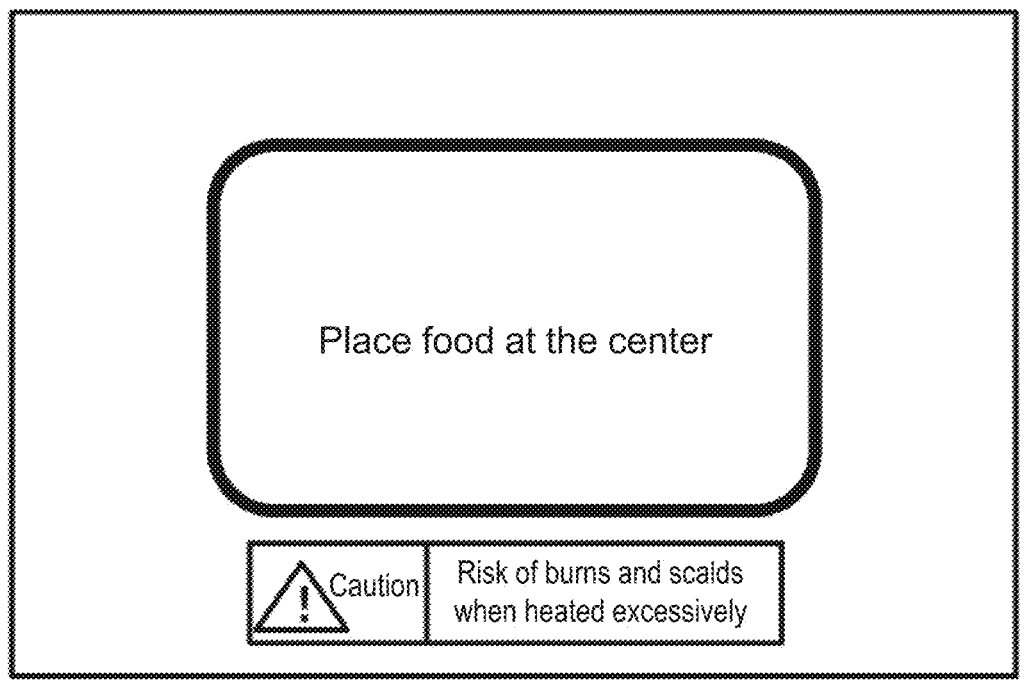
FIG. 4 is a view illustrating a cavity interior image of the heating cooker in an empty state according to the first exemplary embodiment of the present disclosure.

FIG. 4 shows an example of the cavity interior image when heating cavity 201 is empty. In the oven cavity interior, a rectangular frame serving as a guide to indicate the location where food is to be placed and cautions for use are printed on the bottom surface. In the present exemplary embodiment, the following description assumes that a rectangular frame and characters indicating cautions for use or the like are printed in black in a white background. However, the graphical design of the bottom surface of the cavity interior, including its color, may be different.

Figure 5A:
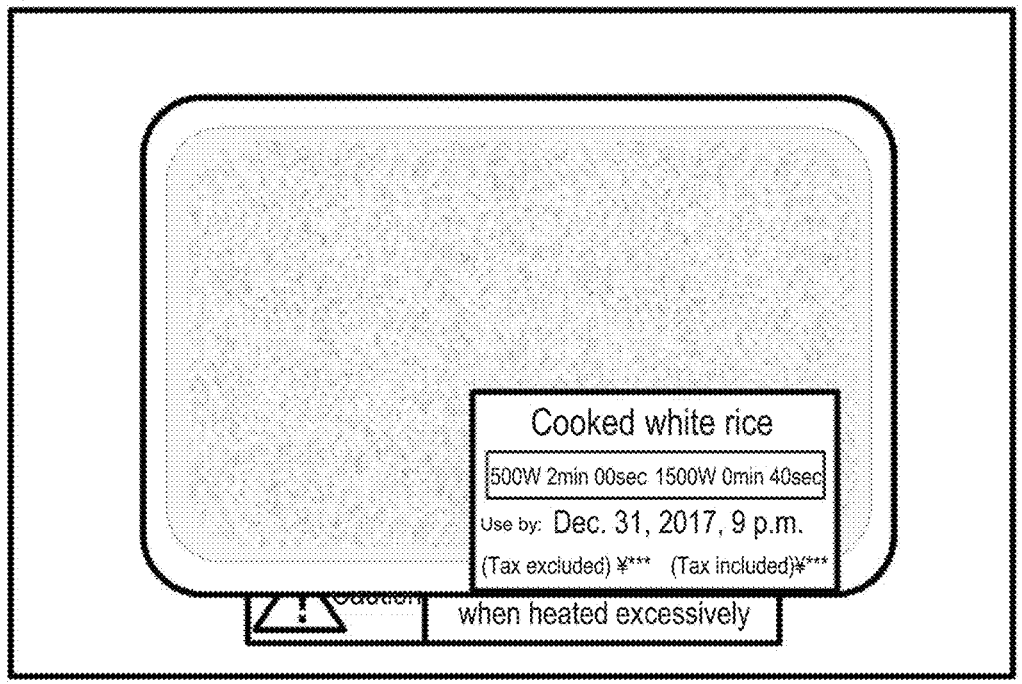
FIG. 5A is a view illustrating an example of the cavity interior image of the heating cooker with food accommodated according to the first exemplary embodiment of the present disclosure, in which food is placed.
Figure 5B:
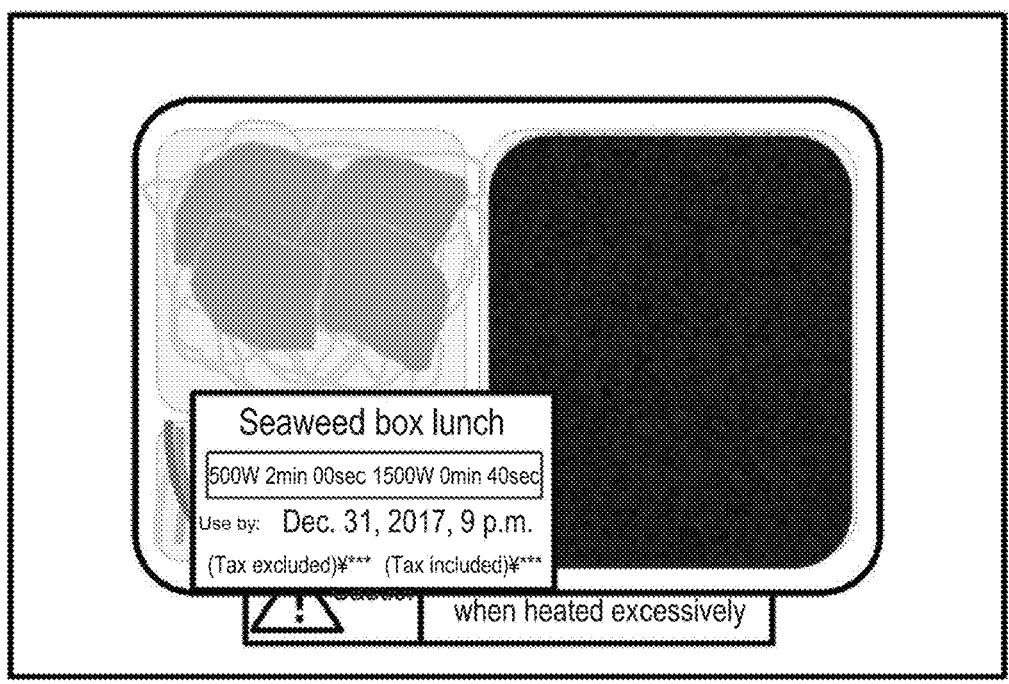
FIG. 5B is a view illustrating another example of the cavity interior image of the heating cooker with food accommodated according to the first exemplary embodiment of the present disclosure, in which food is placed.

FIGS. 5A and 5B each shows an example of another captured image of the interior of heating cavity 201. In these examples, FIG. 5A shows a captured image of the cavity interior in which "cooked white rice" is present in the interior of heating cavity 201 as an example of the food item with a relatively high brightness, and FIG. 5B shows a captured image of the cavity interior in which "seaweed box lunch" is present in the interior of heating cavity 201 as an example of the food item with a relatively low brightness.

Figure 6A:
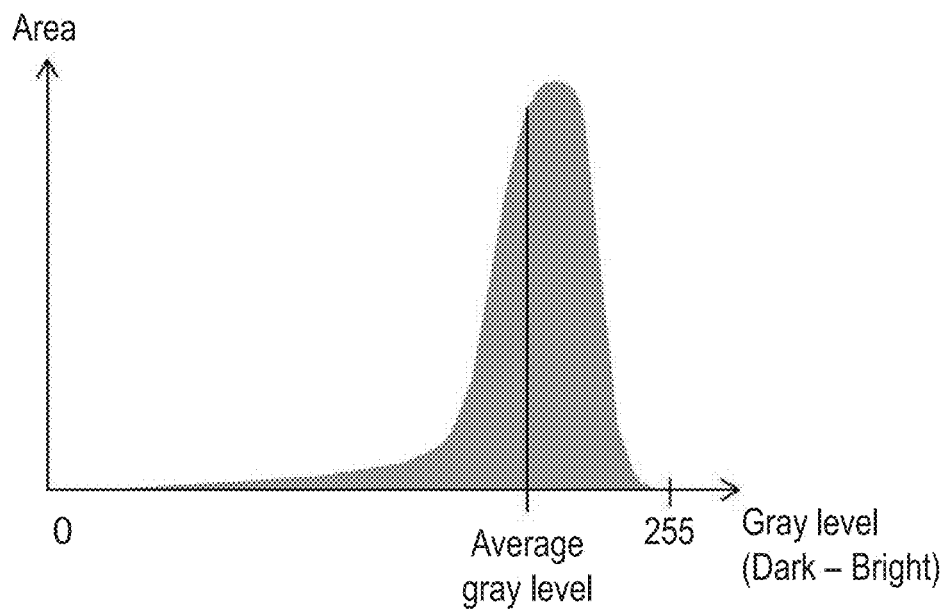
FIG. 6A illustrates one example of a histogram of gray level values of the cavity interior image of the heating cooker with food accommodated according to the first exemplary embodiment.
Figure 6B:
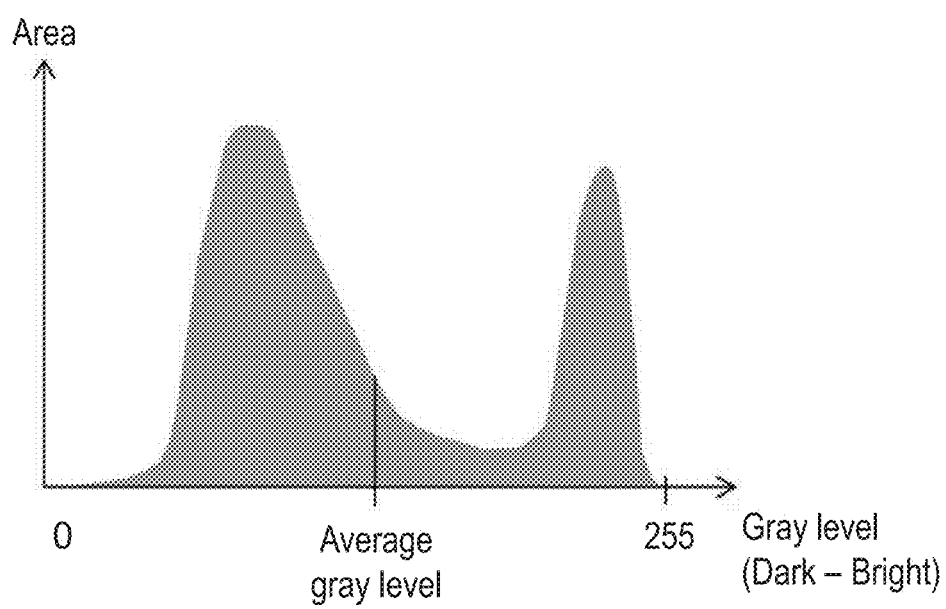
FIG. 6B illustrates another example of the histogram of gray level values of the cavity interior image of the heating cooker with food accommodated according to the first exemplary embodiment.

FIG. 6A and FIG. 6B show histograms of image gray level values and average gray level values that respectively correspond to the captured images in the cases where the food items shown as the examples in FIG. 5A and FIG. 5B are present in the cavity interior. The histograms of the images of FIG. 5A and FIG. 5B correspond to the histograms of FIG. 6A and FIG. 6B, respectively. Specifically, the area of brighter gray levels is large in FIG. 6A, whereas the area of dark gray levels is lager in FIG. 6B.

Figure 7A:
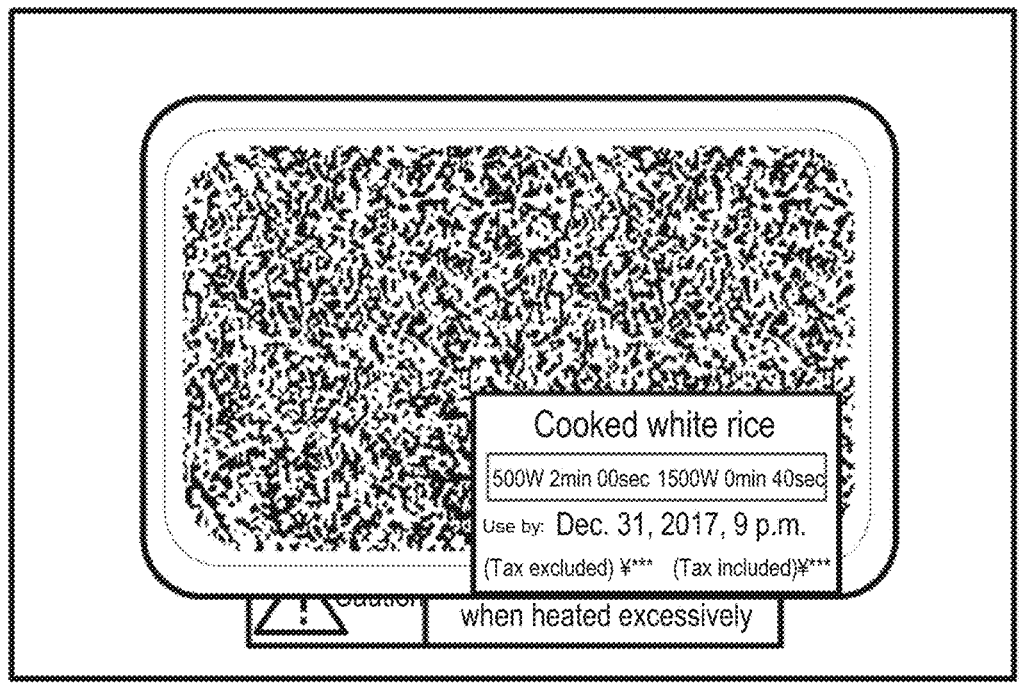
FIG. 7A is a view illustrating an example of a region that passes through a filter when a photometering target detector performs a higher gray level-pass filtering process on the cavity interior image according to the first exemplary embodiment of the present disclosure.
Figure 7B:
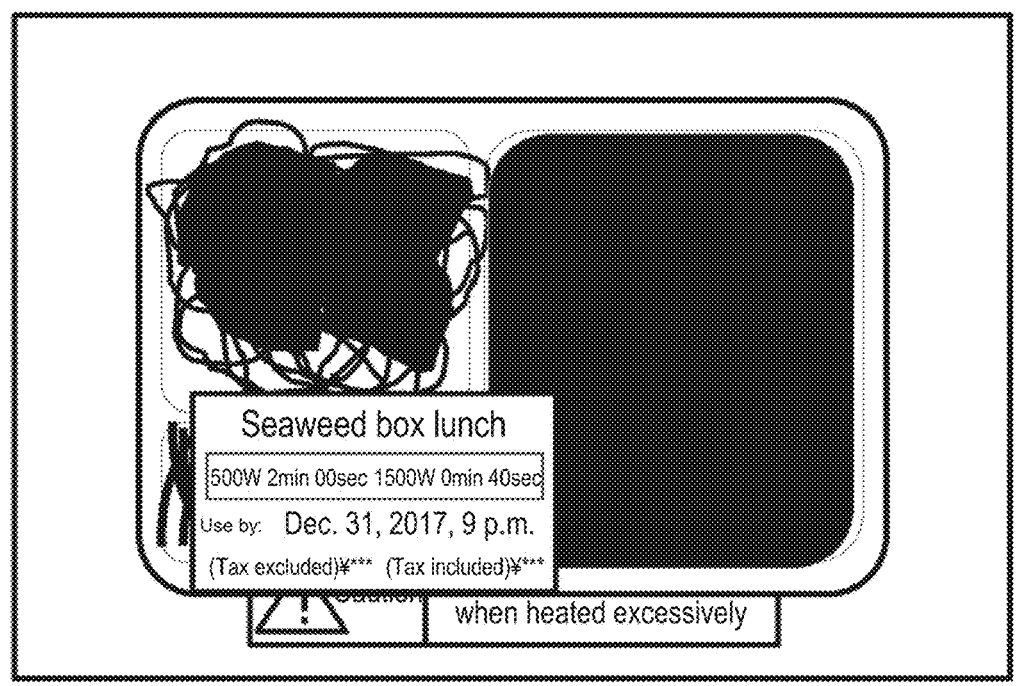
FIG. 7B is a view illustrating another example of the region that passes through a filter when the photometering target detector performs the higher gray level-pass filtering process on the cavity interior image according to the first exemplary embodiment of the present disclosure.

FIG. 7A and FIG. 7B show examples of the pass-through target pixel regions of the filter for the respective captured images of FIG. 5A and FIG. 5B when photometering target detector 303 performs a higher gray level-pass filtering process, which are expressed in black-and-white binary images. In FIGS. 7A and 7B, each of the white color portions represents a pixel region that has been passed through a filter, and each of the black color portions represents a pixel region that has been cut by the filter.

Figure 8A:
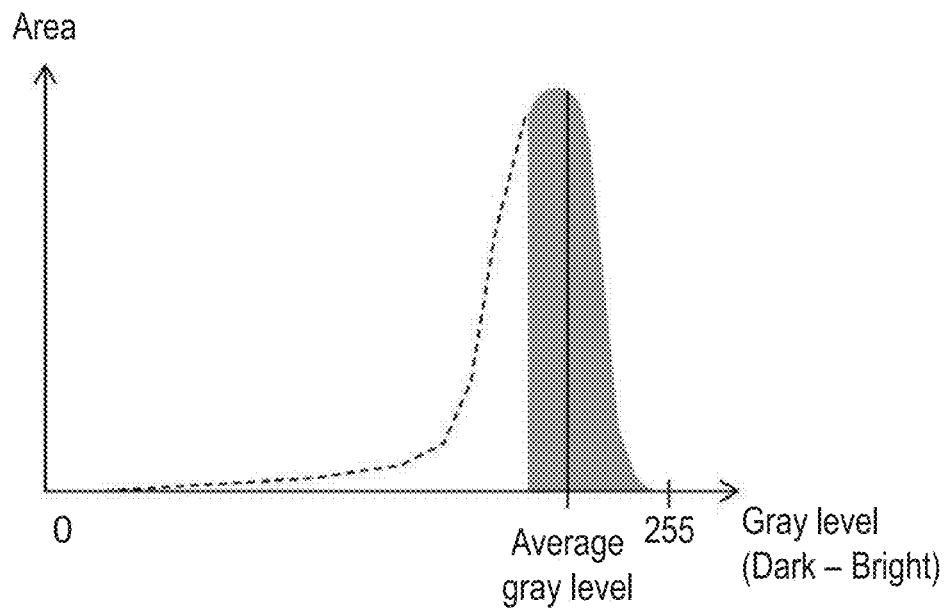
FIG. 8A illustrates an example of a histogram of gray level values of the cavity interior image after the photometering target detector has performed the higher gray level-pass filtering process on the cavity interior image according to the first exemplary embodiment of the present disclosure.
Figure 8B:
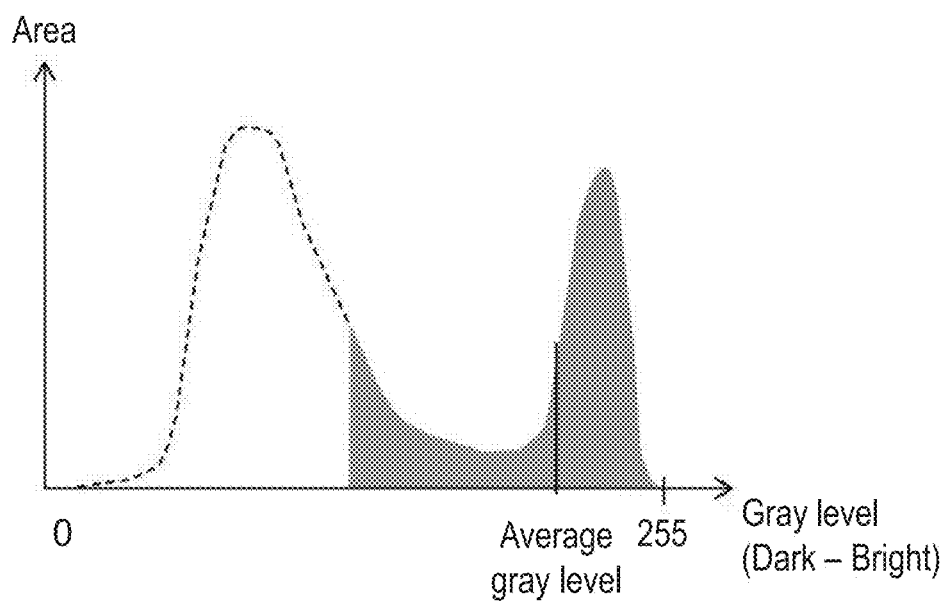
FIG. 8B illustrates another example of the histogram of gray level values of the cavity interior image after the photometering target detector has performed the higher gray level-pass filtering process on the cavity interior image according to the first exemplary embodiment of the present disclosure.

FIG. 8A and FIG. 8B show examples of the cases where photometering target detector 303 performs the higher gray level-pass filtering for the respective cavity interior images of FIG. 5A and FIG. 5B, in other words, examples of the histograms and average gray level values of FIG. 7A and FIG. 7B, respectively. Each of the dashed-line portions of the histograms represents a gray level portion that has been cut by a filter, for the purpose of more clearly showing the effect of the higher gray level-pass filtering process when compared to the histograms of FIG. 6A and FIG. 6B.

Figure 9A:
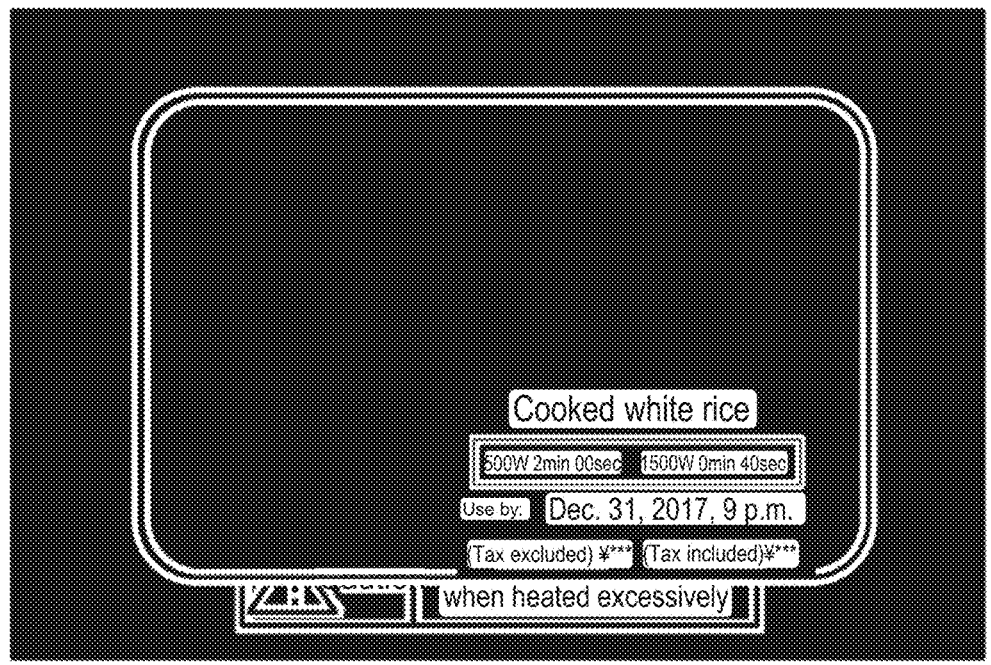
FIG. 9A is a view illustrating an example of a region that passes through a filter when the photometering target detector performs a contrast filtering process on the cavity interior image according to the first exemplary embodiment of the present disclosure.
Figure 9B:
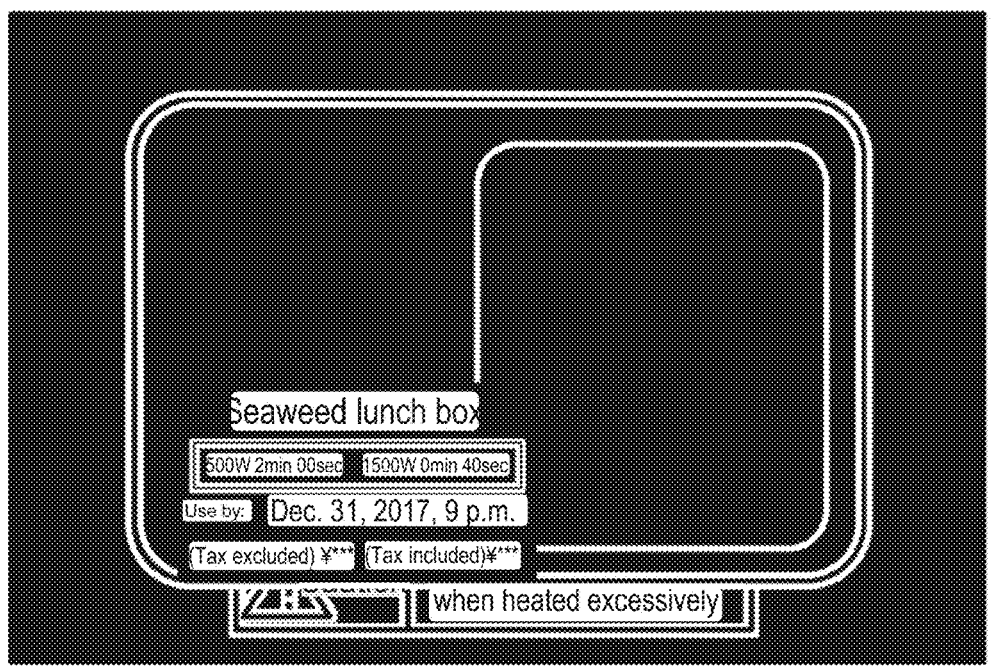
FIG. 9B is a view illustrating another example of the region that passes through the filter when the photometering target detector performs the contrast filtering process on the cavity interior image according to the first exemplary embodiment of the present disclosure.

FIG. 9A and FIG. 9B show examples of the pass-through target pixel regions of the filter for the respective captured images of FIG. 5A and FIG. 5B when photometering target detector 303 performs a contrast filtering process, which are expressed in black-and-white binary images. As in FIGS. 7A and 7B, each of the white color portions represents a pixel region that has been passed through a filter, and each of the black color portions represents a pixel region that has been cut by the filtering process.

Figure 10A:
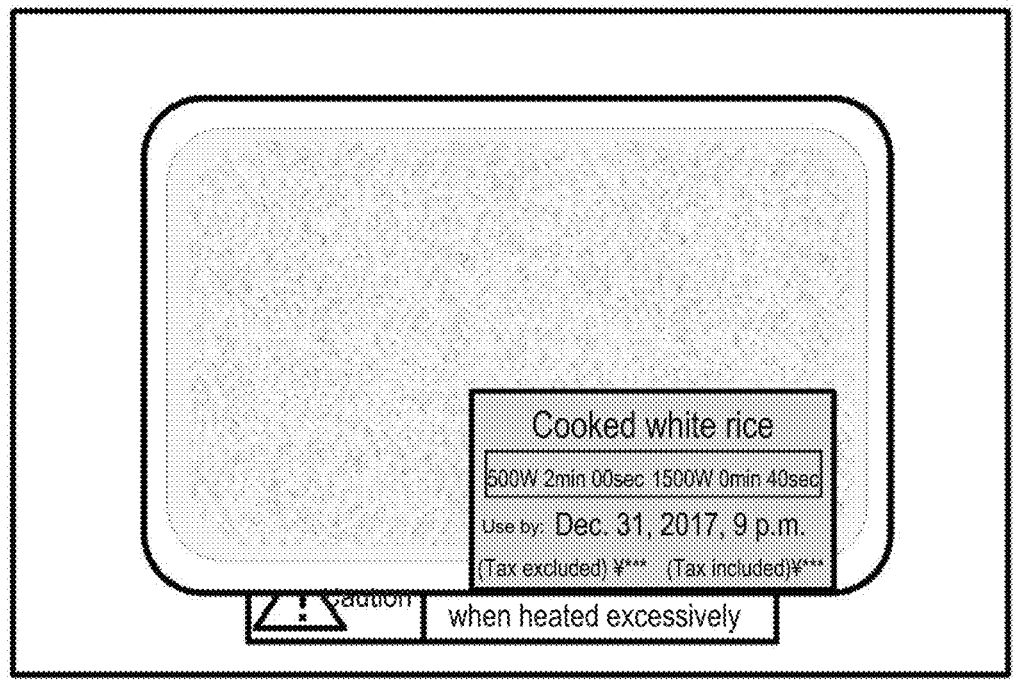
FIG. 10A is a view illustrating the cavity interior image when the photometering target detector performs a chromaticity filtering process on the cavity interior image according to the first exemplary embodiment of the present disclosure.
Figure 10B:
FIG. 10B is a view illustrating another example of the region that passes through the filter when the photometering target detector performs the chromaticity filtering process on the cavity interior image according to the first exemplary embodiment of the present disclosure.

FIG. 10A shows the cavity interior image in the case where a distinctive color (for example, a yellow color that is close to a primary color) is used for the background portion of label 401 that is the photometering target. FIG. 10B shows an example of the pass-through target pixel regions of the filter when photometering target detector 303 performs a chromaticity filtering process for the captured image of FIG. 10A, which are expressed in a black-and-white binary image. As in FIG. 7, each of the white color portions represents a pixel region that has been passed through a filter, and each of the black color portions represents a pixel region that has been cut by the filter. Although the present exemplary embodiment illustrates an example in which the background color is a yellow color that is close to a primary color, the color is not limited to a particular color.

Figure 11:
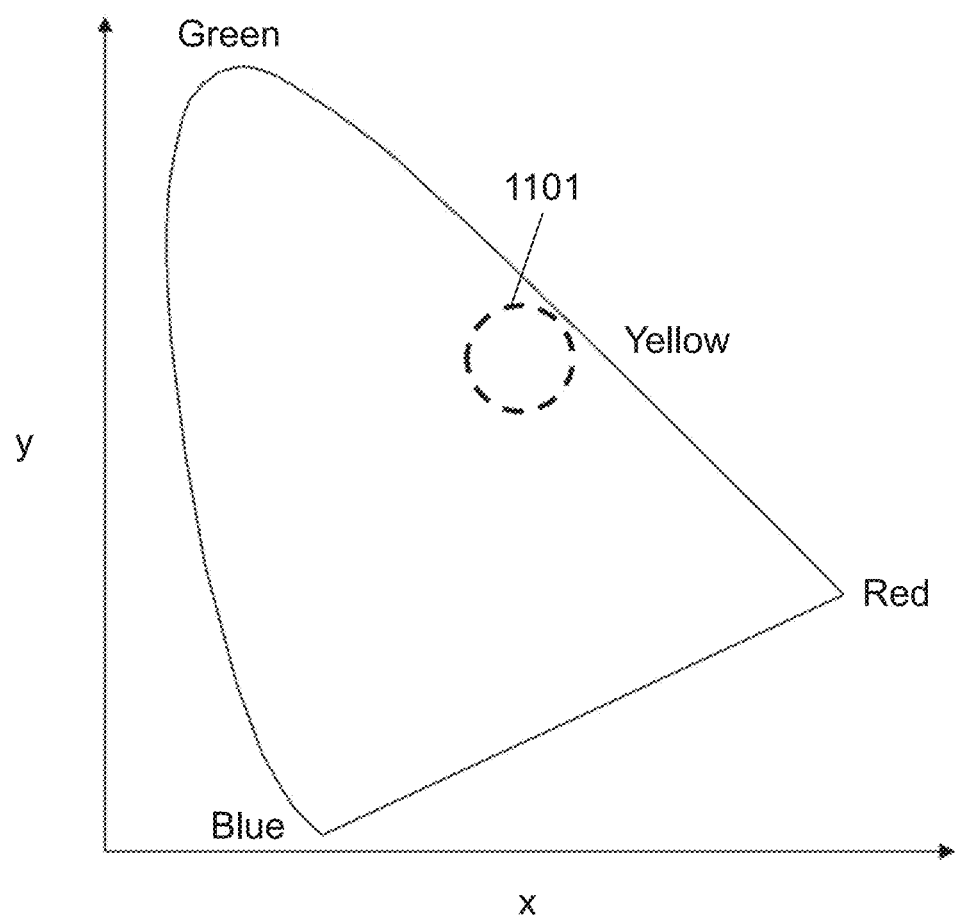
FIG. 11 is a view illustrating an example of a filtering range in an xy chromaticity diagram when the photometering target detector performs the chromaticity filtering process on the cavity interior image according to the first exemplary embodiment of the present disclosure.

FIG. 11 illustrates an xy chromaticity diagram showing a chromaticity range passed by the filter when photometering target detector 303 performs the chromaticity filtering process. The inside of the circle indicated by dashed line 1101 in the figure represents the chromaticity range passed by the filter. It should be noted that the chromaticity range passed by the filter may be other than a circular shape, such as a rectangular shape, or may be specified by a mathematical function. It is also possible to use a chromaticity diagram other than xy chromaticity diagram, such as uv chromaticity diagram and u' v' chromaticity diagram. It is also possible to use a color system other than the XYZ color space, such as L*u*v* color space, L*a*b* color space, and HSV color space.

Figure 12:
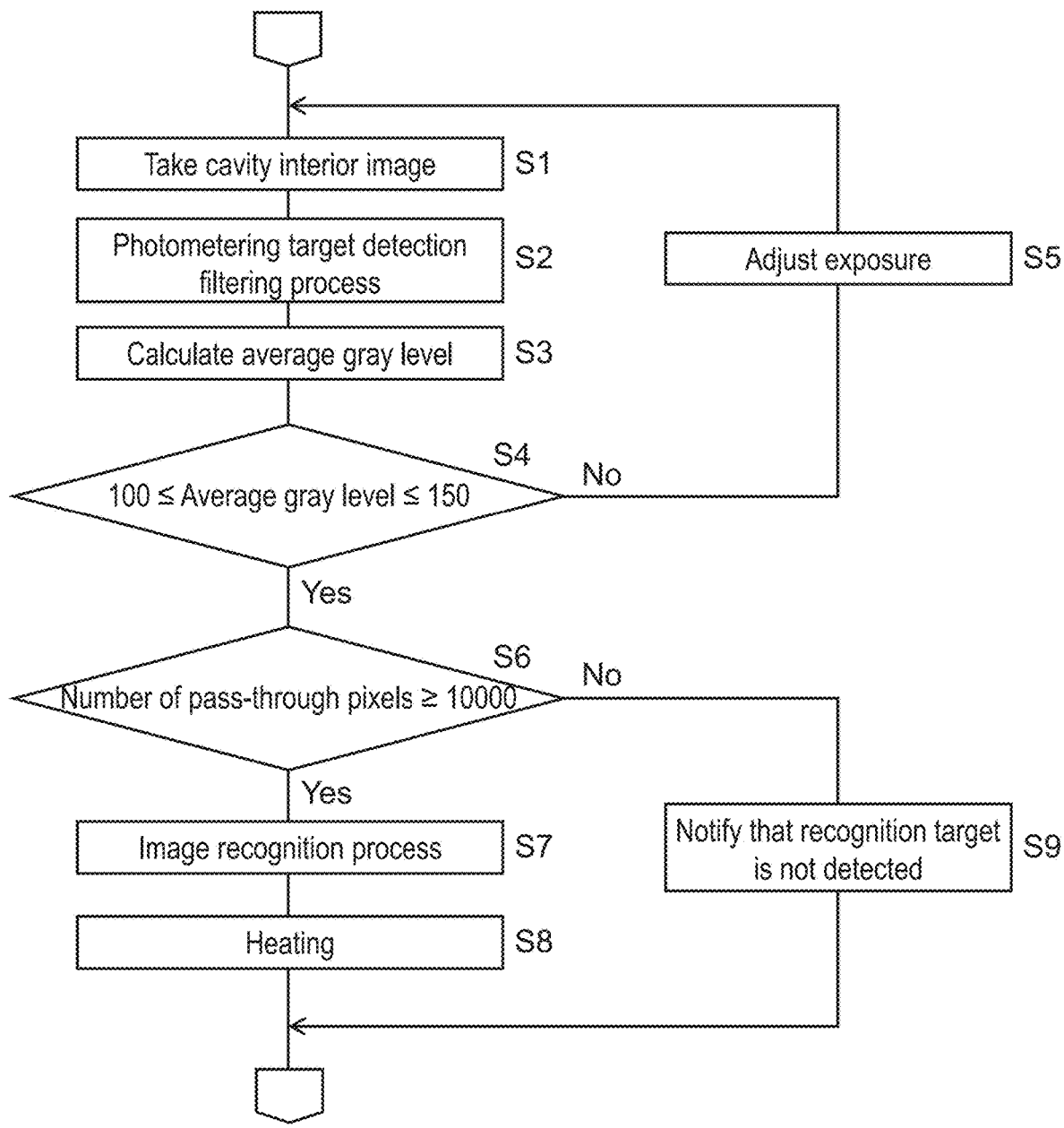
FIG. 12 is a flowchart illustrating the operation flow of the heating cooker according to the first exemplary embodiment of the present disclosure.

FIG. 12 is a flow chart illustrating an operation of exposure control of microwave oven 100 according to the first exemplary embodiment. Hereinbelow, the details will be discussed with reference to the flowchart of FIG. 12.

In step S1, camera 204 captures the cavity interior image with an initial exposure setting, and controller 300 causes the process to proceed to step S2. As a result of the image capturing, the cavity interior image, such as shown in FIGS. 5A and 5B, is obtained.

In step S2, photometering target detector 303 performs a photometering target detection filtering process on the cavity interior image. In the present exemplary embodiment, photometering target detector 303 performs at least one of the higher gray level-pass filtering process, the contrast filtering process, and the chromaticity filtering process. In the following, each of the filtering processes will be described in detail.

First, the higher gray level-pass filtering process will be described. When photometering target detector 303 uses this filtering process, it is a prerequisite that the background of food label 401 that is the recognition and photometering target has a relatively high brightness, such as white in color. It should be noted that the description assumes that gray images, not color images, are used when performing a series of processes. Therefore, the term "gray level" refers to gray scale levels (black: 0, white: 255).

A specific flow of the higher gray level-pass filtering process is as follows. First, a histograms with gray level values, such as shown in FIGS. 6A and 6B, is created for each of the cavity interior images as shown in FIGS. 5A and 5B. FIG. 5A shows the cavity interior image containing "cooked white rice" as an example of the food item with a relatively high brightness, and FIG. 5B shows a captured image of the cavity interior containing "seaweed box lunch" as an example of the food item with a relatively low brightness. Accordingly, as a corresponding histogram, FIG. 6A shows a histogram shape that is gathered in a higher gray level range. FIG. 6B shows such a histogram shape that there is a peak in a lower gray level range, corresponding to a black "seaweed" portion of the "seaweed box lunch", which has particularly a lower brightness, and there is also a peak in a higher gray level range because food label 401 and the bottom surface of the cavity interior are white in color and have a high brightness.

Also for the average gray level value, a significant difference appears in the average gray level value of the entire image between food items having different brightness, such as "cooked white rice" and "seaweed box lunch", as shown in FIGS. 6A and 6B. In the exposure control described in the present exemplary embodiment, which is the process performed in later-described step S3, the average gray level value of the entire image is calculated as an estimated gray level value of the food label (i.e., label 401) portion, which is the photometering target when performing recognition and exposure adjustment.

At a stage where a filtering process has not been performed, a difference in brightness between the food items other than the food label (label 401) region appears as the difference in the average gray level value as shown in FIGS. 6A and 6B, even in the same illuminance environment. In other words, because there is a large error in gray level estimation, it is difficult to use the average gray level value directly for the exposure control. The higher gray level-pass filtering process passes only a predetermined proportion of higher gray level values with respect to the total number of pixels in the image, and cuts off lower gray level values.

FIG. 7A and FIG. 7B are images in which the pass-through target pixel regions are expressed in black-and-white binary images when the higher gray level-pass filtering process is performed for the cavity interior images of FIG. 5A and FIG. 5B, respectively. A portion of the image with higher brightness, including the food label (i.e., label 401) that is the photometering target, is the pass-through pixel region.

For example, when a pass filter that passes top 50% is assumed, the bottom 50% of the area of the histogram in FIG. 6A and FIG. 6B is cut off, so that the shapes as shown in FIG. 8A and FIG. 8B are obtained. The dashed-line portion represents the bottom 50% pixels, which have been cut off by the filter. When calculating the average gray level value, the pixels that have been cut off are not used for the calculation. Therefore, the difference between the two average gray level values becomes smaller in comparison with that between FIG. 6A and FIG. 6B, and the error in gray level estimation becomes smaller. When it is a prerequisite that the brightness of the recognition and photometering target is high, such a filtering process makes it possible to estimate the gray level value of the photometering target (i.e., the label portion) at high speed and with high accuracy by performing a simple filtering process in the pre-processing stage, without performing detection of the label portion (i.e., label 401). As a result, it is possible to recognize the characters in the label portion easily.

Next, the contrast filtering process will be described. The basic idea is the same as the higher gray level-pass filtering process. The purpose is to enable the filtering process to eliminate the adverse effects originating from other portions than the food label, which is the recognition and photometering target, and reduce the estimation error for the gray level value used for the exposure control. When photometering target detector 303 uses the contrast filtering process, it is a prerequisite that the recognition target portion of the food label that is the recognition and photometering target has high black and white contrast, such as in the case of characters or barcodes. As a specific filtering process, photometering target detector 303 performs a process of passing only pixels in the vicinity of a target pixel, which have gray level values with a predetermined gray level difference from the target pixel. Specifically, photometering target detector 303 passes only pixels having gray level values with a predetermined gray level difference from the gray level of a pixel in a predetermined pixel region as the photometering target.

For example, when it is to be determined whether a certain target pixel in the image is allowed to pass through the filter, a process of checking a 5×5 pixel region around the target pixel is performed. For example, when the target pixel has a gray level value of 200 and there exists a pixel having a gray level of less than or equal to 100, which is a gray level of −100, in the 5×5 pixel region, the target pixel is determined to be a pass-through pixel, whereas when there exists no such pixel, the target pixel is determined to be a cut pixel. Such a process is carried out for all the pixels in the image. The 5×5 pixel region size mentioned herein is merely an example, and it should be understood that the shape of the region, including its size, is not limited to such a rectangular shape. The gray level difference of −100 is also merely an example, and the numerical value is not specifically limited.

FIG. 9A and FIG. 9B are images in which the pass-through target pixel regions are expressed in black-and-white binary images when the chromaticity filtering process is performed for the cavity interior images of FIG. 5A and FIG. 5B, respectively. A portion of the image with higher black and white contrast, including the character portion that is the recognition target, is the pass-through pixel region. When it is a prerequisite that the contrast of the recognition and photometering target is high, the contrast filtering process makes it possible to estimate the gray level value of the photometering target at high speed and with high accuracy by performing a simple filtering process in the pre-processing stage, without performing detection of the label portion. As a result, it is possible to recognize the characters in the label portion easily.

Next, the chromaticity filtering process will be described. The basic idea is the same as the higher gray level-pass filtering process. The chromaticity filtering process can eliminate the adverse effects originating from other portions than the food label, which is the recognition and photometering target, and reduce the estimation error for the gray level value used for the exposure control. When photometering target detector 303 uses the chromaticity filtering process, it is a prerequisite that the color of the label that is the photometering target is distinctive, for example.

FIG. 10A shows an example of the cavity interior image in the case where the food label is yellow, for example. Because the label portion is colored, the gray level of the label portion of the captured image is lower than the gray level of the bottom surface of the cavity interior, which is white in color. As a specific filtering process, photometering target detector 303 performs a process of passing only a gray level value of a pixel that falls within a predetermined range in a chromaticity diagram. For example, assume that the RBG levels of a certain pixel in the image are: R: 100, G: 100, and B: 10.

For example, based on the ITU-R BT. 709 standard, X, Y, Z are calculated as follows: $X=0.4124R+0.3576G+0.1805B$, $Y=0.2126R+0.7152G+0.0722B$, $Z=0.0193R+0.1192G+0.9505B$. Furthermore, because $x=X/(X+Y+Z)$ and $y=Y/(X+Y+Z)$, the chromaticities x, y are calculated to be: $x=0.4028$ and $y=0.4779$. When these values x and y are contained in a predetermined range 1101 on the xy chromaticity diagram of FIG. 11, photometering target detector 303 determines the target pixel to be a pass-through pixel. When the values x and y are outside range 1101 in the xy chromaticity diagram of FIG. 11, photometering target detector 303 determines the target pixel to be a cut pixel. In other words, photometering target detector 303 passes only a gray level value of a pixel that falls within a predetermined chromaticity range. Photometering target detector 303 performs the process as described above for all the pixels in the image.

In this filter, RGB levels are used because color information is used to confirm the filtering condition, but when calculating the average gray level, gray scale levels are used. The conversion from RGB level to gray scale level can be calculated by: $0.299R+0.587G+0.114B$.

FIG. 10B is an image of the pass-through target pixel region when the contrast filtering process is performed for the cavity interior image of FIG. 10A, which is expressed in a black-and-white binary image. The label portion that is the recognition target is the pass-through target region. When it is a prerequisite that the color of the recognition and photometering target is distinctive, the above-described filtering process makes it possible to estimate the gray level value of the photometering target at high speed and with high accuracy by performing a simple filtering process in the pre-processing stage, without performing detection of the label portion. As a result, the characters in the label portion are recognized easily.

Photometering target detector 303 performs any of the higher gray level-pass filtering process, the contrast filtering process, and the chromaticity filtering process to pass only the gray level information of the photometering and recognition target portion from the image captured by camera 204. Thereafter, controller 300 causes the process to proceed to step S3.

In step S3, photometering target detector 303 calculates the average gray scale value of the entire image in accordance with the gray level values that has passed through the filtering process in step S2. Thereafter, controller 300 causes the process to proceed to step S4.

In step S4, exposure controller 304 judges whether or not exposure adjustment is necessary based on the average gray level value calculated in step S3. For example, when the average gray level value is greater than or equal to 100 and less than or equal to 150, it is judged that the image captured already has a suitable brightness for recognition. Accordingly, exposure controller 304 does not perform exposure adjustment, and controller 300 causes the process to proceed to step S6. When the average gray level value is either less than 100 or greater than 150, exposure controller 304 judges that exposure adjustment is necessary. Accordingly, controller 300 causes the process to proceed to step S5. The just-mentioned threshold values, 100 and 150, are merely examples, and the numerical range is not specifically limited.

In step S5, exposure controller 304 performs exposure adjustment according to the average gray level value. For example, if the average gray level value is less than 100, exposure controller 304 judges that the cavity interior image is too dark, and causes camera 204 to set a longer exposure time. In other words, exposure controller 304 performs exposure control based on the gray level information obtained from an image captured by camera 204.

On the other hand, if the average gray level value is greater than 150, exposure controller 304 judges that the cavity interior image is too bright, and causes camera 204 to set a shorter exposure time. Adjusting the exposure time is described as a specific example of exposure adjustment, but it is possible to use other techniques. For example, it is possible to employ a method of adjusting the gain setting of camera 204. It is also possible to use the exposure time adjustment and the gain adjustment in combination. Alternatively, it is possible to control the brightness of the interior of the cavity with use of illumination 205. After performing the exposure adjustment, the process returns to step S1, and the process continues again from the capturing of the cavity interior image.

In step S6, controller 300 judges whether or not the number of pixels that have been passed by the filtering process of step S2 exceeds a predetermined number. For example, if the number of the passed pixels is greater than or equal to 10000, controller 300 causes the process to proceed to step S7, which is the image recognition process. If the number of the passed pixels is less than 10000, controller 300 causes the process to proceed to step S9.

In step S9, controller 300 judges, as the result of step S6, that the food label that is the recognition target is not captured in the captured image, or that although the food label is partially captured, it is inappropriate because the label is partially out of the image. Then, controller 300 notifies the user that the recognition target is not detected, and the process is terminated without performing the recognition process or heating. In other words, if the number of pixels that have been detected as the photometering target is less than a predetermined number, controller 300 notifies the user that the recognition target is not detected. Because the user is notified that the recognition target is not detected without performing the recognition process, the user may be urged quickly to place the food again or check the condition of the food label.

In step S7, recognizer 302 performs the image recognition process on the cavity interior image captured by camera 204 to acquire heating control information, and the process proceeds to step S8.

In step S8, heating controller 301 performs heat-cooking based on the heating control information acquired in step S7, and the process is terminated.

As has been described above, the present exemplary embodiment makes it possible to estimate the gray level of the food label portion that is the recognition and photometering target with high accuracy from the gray level information of the image captured by camera 204, even when an adverse effect is caused by the ambient light entering through the aperture of the door 102 of the microwave oven. Moreover, because exposure controller 304 performs appropriate exposure control according to the estimated gray level, it is possible to carry out a highly accurate image recognition process on an image that is captured at a suitable brightness for recognition.

Other Exemplary Embodiments

The above-described exemplary embodiment may be implemented as a heating cooking system that controls a heating cooker such as a microwave oven through a server on a network, by configuring the heating cooker to be connectable to the network. In such a heating cooking system, the processes that are performed by photometering target detector 303 of microwave oven 100 according to the first exemplary embodiment are executed on the server side. Thus, it is possible to reduce the processing load caused by the image filtering process in the heating cooker.

It will be appreciated that the foregoing exemplary embodiments merely illustrate the technology of the present disclosure, and therefore, various modifications, substitutions, additions, and subtractions may be made within the scope of the claims and equivalents thereof.

The heating cooker according to the present disclosure is able to recognize the features of an item such as shape and the situations in the heating cavity such as characters by capturing an image with a camera and to reflect the results of recognition for cooking control. Therefore, the present disclosure is widely applicable to various heating cookers, such as home-use microwave ovens, rice cookers, and IH cooking heaters, in addition to microwave ovens used at stores.

REFERENCE MARKS IN THE DRAWINGS 100 microwave oven (heating cooker)
101 housing
102 door
103 glass window
104 handle
105 operation display unit
106 liquid crystal display
107 time setting button group
108 heating start button
108 cancel button
109 pause button
201 heating cavity
202a, 202b magnetron
203 heating target
204 camera
205 illumination
300 controller
301 heating controller
302 recognizer
303 photometering target detector
304 exposure controller

The invention claimed is:

1. A heating cooker comprising:
a heating cavity operable to accommodate a heating target;
an imager operable to capture an image of an interior of the heating cavity;
an exposure controller operable to perform exposure control; and
a photometering target detector operable to extract gray level information of a photometering target from the image captured by the imager, the photometering target being a part of an entirety of the image, wherein:
the exposure controller is operable to perform the exposure control based on the gray level information obtained from the image captured by the imager,
the photometering target detector is operable to extract the gray level information by performing a filtering process on the entirety of the image captured by the imager, and
the filtering process includes at least one of a higher gray level-pass filtering process, a contrast filtering process or a chromaticity filtering process.

2. The heating cooker according to claim 1, wherein the photometering target detector is operable to pass only a predetermined proportion of higher gray level values in the image.

3. The heating cooker according to claim 1, wherein the photometering target detector is operable to pass only pixels having gray level values with a predetermined gray level difference from a pixel in a predetermined pixel region of the photometering target.

4. The heating cooker according to claim 1, wherein the photometering target detector is operable to pass only gray level values of pixels that are within a predetermined chromaticity range.

5. The heating cooker according to any one of claim 1, 2 or 3, wherein, when a number of pixels detected as the photometering target is less than a predetermined number, the photometering target detector is operable to notify a user that a recognition target is not detected.

6. The heating cooker according to claim 1, wherein:
the filtering process includes the higher gray level-pass filtering process, and
the higher gray level-pass filtering process passes only a predetermined proportion of higher gray level values with respect to a total number of pixels in the image, and cuts off lower gray level values.

7. The heating cooker according to claim 1, wherein:
the filtering process includes the contrast filtering process, and
the contrast filtering process passes only pixels having gray level values with a predetermined gray level difference from a gray level of a pixel in the photometering target.

8. The heating cooker according to claim 1, wherein:
the filtering process includes the higher gray level-pass filtering process, and
the higher gray level-pass filtering process passes only a gray level value of a pixel that falls within a predetermined range in a chromaticity diagram.

\* \* \* \* \*